July 24, 1934.  J. F. DACOSTA  1,967,926
BICYCLE LOCK
Filed Feb. 6, 1933
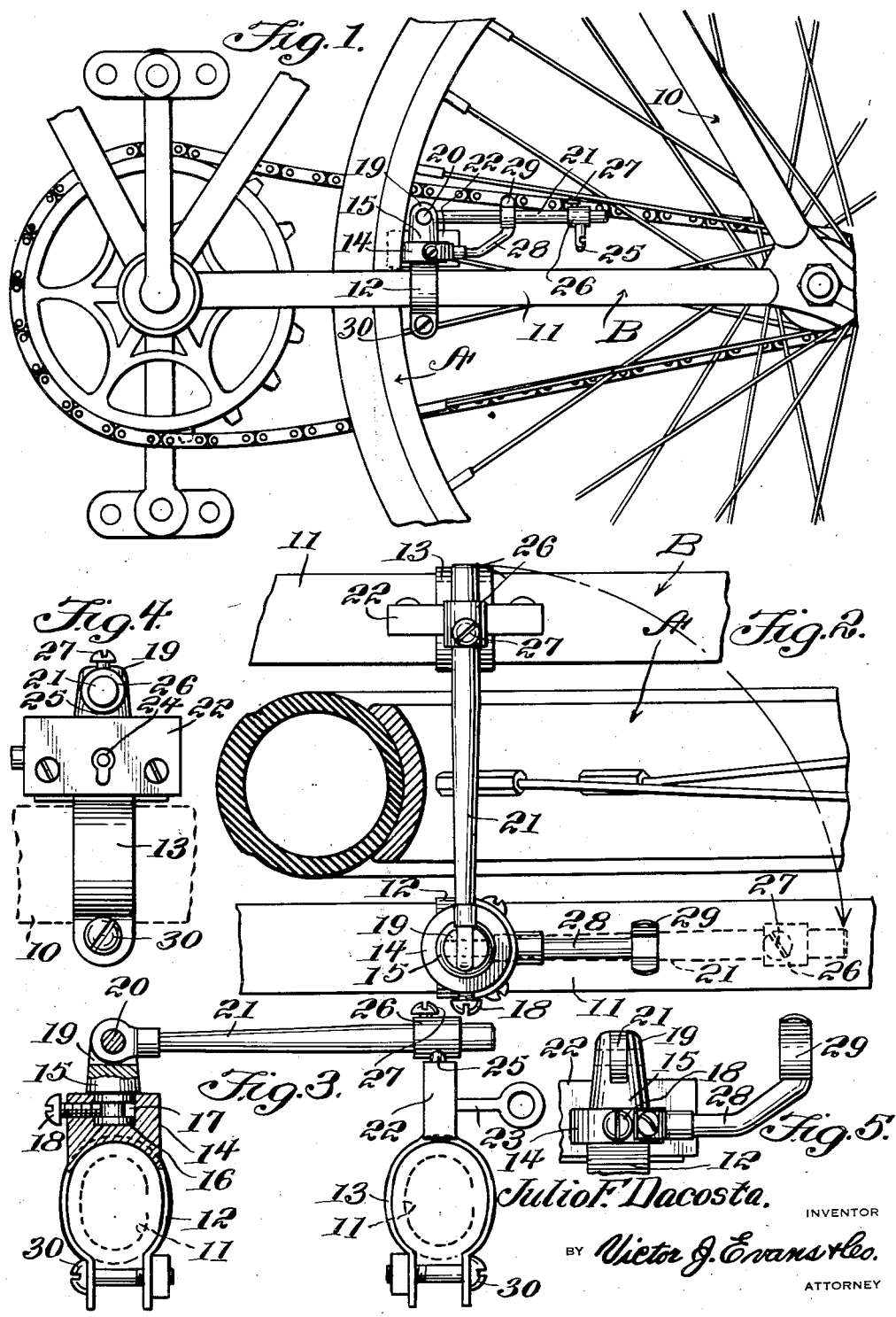

Patented July 24, 1934

1,967,926

UNITED STATES PATENT OFFICE 1,967,926

BICYCLE LOCK

Julio Felix Dacosta, Cienfuegos, Cuba

Application February 6, 1933, Serial No. 655,531

1 Claim. (Cl. 70—90)

The invention relates to a lock and more especially to bicycle locks.

The primary object of the invention is the provision of a lock of this character, wherein the same is mountable upon the frame of a bicycle and when not in use will be held firmly so as to avoid rattling thereof and handy for use so that the rear driving wheel of the bicycle can be locked, thus eliminating the possibility of the theft of such bicycle.

Another object of the invention is the provision of a lock of this character, wherein the construction thereof is novel in form to enable its use upon bicycles without necessitating any change or alteration in the bicycle structure.

A further object of the invention is the provision of a lock of this character which is extremely simple in construction, thoroughly reliable and efficient in its purpose, readily and easily applied to and removed from a bicycle, strong, durable, convenient when applied to the bicycle for use, and inexpensive to manufacture.

With these and other objects in view, the invention consists in the features of construction, combination and arrangement of parts as will be hereinafter more fully described in detail, illustrated in the accompanying drawing, which discloses the preferred embodiment of the invention, and pointed out in the claim hereunto appended.

In the accompanying drawing:

Figure 1 is a fragmentary side elevation of a bicycle showing the lock constructed in accordance with the invention applied thereto and in normal unlocked position.

Figure 2 is a fragmentary horizontal transverse sectional view through the bicycle showing the lock in locking position.

Figure 3 is an elevation partly in vertical transverse section of the lock.

Figure 4 is a side view thereof looking toward the side of the same opposite that shown in Figure 1.

Figure 5 is a fragmentary detail elevation in locking position.

Similar reference characters indicate corresponding parts throughout the several views in the drawing.

Referring to the drawing in detail, A designates generally a portion of the rear driving wheel of a bicycle and B the frame of the latter which includes the rear fork 10 for the rear driving wheel A. This fork at the horizontal bar portions 11 thereof carries the lock constituting the present invention and hereinafter fully described.

The lock comprises a pair of clips 12 and 13 respectively, these embracing the horizontal bar portions 11 of the fork 10. The clip 12 has formed at its upper portion a socketed boss 14 for accommodating a swivel stud 15, the latter formed with a channeled reduced portion 16 which fits within the socket 17 of the boss 14 and engaged with this channeled reduced portion is a retaining screw 18 threaded in said boss transversely thereof so that the stud 15 will be swiveled in its coupled connection with the boss 14. The boss is formed with a forked upper end 19 having a pivot 20 engaged therein for swingingly connecting therewith a locking bolt 21, which latter can be disposed crosswise between the horizontal bar portions 11 of the fork 10 to intercept the wire spoked driving wheel A of the bicycle, and in this fashion lock such wheel.

The clip 13 has built thereon a lock casing 22 containing key operated locking mechanism (not shown), the key 23 being insertable through a suitable keyhole 24 in the casing for permitting the operation of the lock mechanism therein. The bolt 21 has adjustably fitted thereon a keeper 25, the same being formed with a sleeve 26 which slidably fits over the bolt 21 and is made fast in adjusted position by a set screw 27 thereon. The keeper 25 is adapted to be inserted through a clearance hole into the lock casing 22 to be secured by the lock mechanism therein and such keeper is released on manipulating the key 23 for this purpose.

Carried by the boss 14 is an arm 28 having at its free end a fork-like resilient clip 29 for receiving the bolt 21 when in normal position as shown by full lines in Figure 1 and by dotted lines in Figure 2 of the drawing. The normal position of the bolt is such as to free the wheel A of the bicycle and when the bolt is engaged in the clip 29 it will be prevented from rattling during the use of the bicycle.

The clips 12 and 13 are held in embracing relation to the horizontal bar portions 11 of the rear fork 10 through fasteners 30.

The construction and manner of use of the lock constituting the present invention should be clearly understood from the foregoing description taken in connection with the accompanying drawing and therefore a more extended explanation has been omitted.

What is claimed is:

A lock of the character described comprising a pair of clips for mounting on opposite horizontal bars of a rear wheel bicycle fork, a socketed boss formed on one of the clips, with the socket therein opening upwardly, a swiveled stud fitted in said socketed boss and having an annular channel, a retaining screw threaded in the boss and engaged in the channel for the swivel connection of said stud, lock mechanism formed with the other clip, a locking bolt swingingly connected to the stud, and a keeper slidably secured to the bolt and made secure by said locking mechanism.

JULIO FELIX DACOSTA.